May 22, 1945.  G. F. DRAKE  2,376,421
METHOD AND APPARATUS FOR PRODUCING ALTERNATING CURRENT
OF PRECISELY CONTROLLED FREQUENCY
Filed June 7, 1943
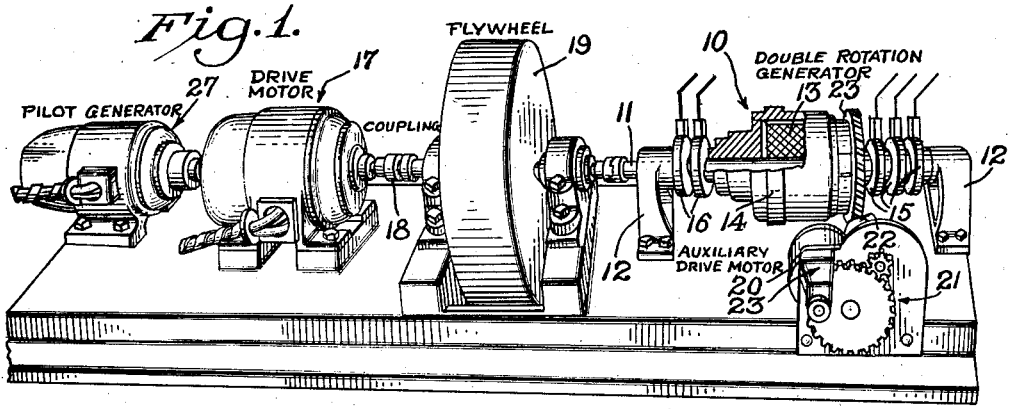
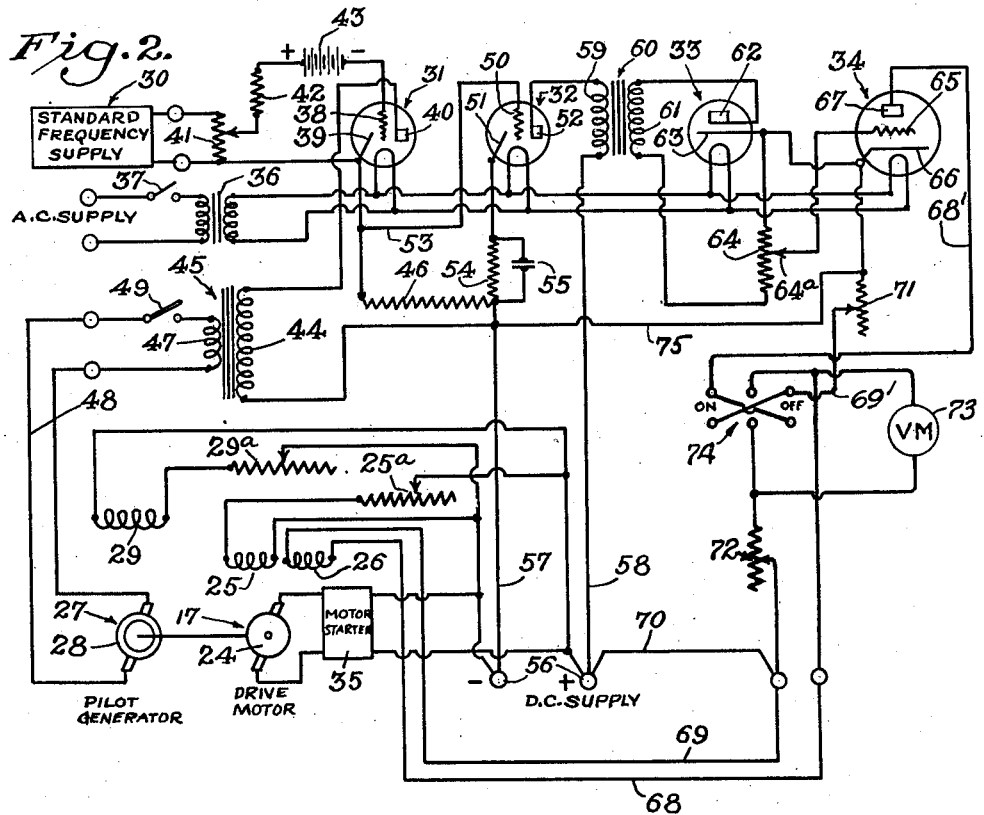
Inventor
George Forrest Drake
BY
Parker, Carlson, Pitzner & Hubbard
Attorneys Patented May 22, 1945

2,376,421

UNITED STATES PATENT OFFICE 2,376,421

METHOD AND APPARATUS FOR PRODUCING ALTERNATING CURRENT OF PRECISELY CONTROLLED FREQUENCY

George Forrest Drake, Rockford, Ill., assignor to Woodward Governor Company, Rockford, Ill., a corporation of Illinois Application June 7, 1943, Serial No. 489,942

8 Claims. (Cl. 171—119)

The present invention has to do with the production of alternating current of precisely controlled, and variable, instantaneous frequency. Precision of control is herein contemplated of the order of magnitude of 5/10,000 cycle per second maximum deviation from a selected value of instantaneous frequency. The need for such exactitude in instantaneous frequency arises in a variety of fields. Simply by way of example, it may be noted that adjustment of steam turbine governors is an instance in point. The present invention makes possible their adjustment to a point of sensitivity heretofore unobtainable and which could not, as a matter of fact, have even been checked with heretofore available apparatus.

By way of introduction, it should also be noted that the emphasis here is on accuracy of instantaneous frequency as distinguished from accuracy of average frequency. This is, incidentally, the reverse of the requisites normally set up in chronometric systems.

Generally stated, the object of the present invention is to provide a method and apparatus for producing an alternating current whose instantaneous frequency is controlled with extreme precision, the accuracy of control affording a maximum of deviation of the instantaneous frequency of less than 1/1000 of a percent.

More specifically, the object of the invention is to provide an apparatus of the type indicated employing a double rotation generator, as well as a novel method of operating the same, to produce an output of precisely controlled and determinate frequency.

Further objects and advantages of the invention will become apparent as the following description proceeds, taken in connection with the accompanying drawing in which:

Figure 1 is a general perspective view of a generating apparatus embodying the present invention and adapted to be operated in accordance with the herein disclosed novel method.

Fig. 2 is a schematic wiring diagram of the control system for the drive motor included in the apparatus of Fig. 1.

While the invention is susceptible of various modifications and alternative constructions, I have shown in the drawing and will herein describe in detail the preferred embodiment of the apparatus and conduct of the method, but it is to be understood that I do not thereby intend to limit the invention to the specific form or procedure disclosed, but intend to cover all modifications and alternative constructions and methods falling within the spirit and scope of the invention as expressed in the appended claims.

In carrying out the present invention, a double rotation generator, indicated at 10 in Fig. 1, is employed. Double rotation generators, as such, have been known in the electrical arts for some years and normally comprise primary and secondary members which are arranged to be revolved in opposite directions and at substantially equal speeds. The general purpose in such cases has been to make it possible to drive the two oppositely rotating parts of the generator at approximately only one-half the speed that would be required for a generator of similar capacity having only the usual one rotary element or rotor. Although a double rotation generator is here employed, it is operated in a basically different manner and for a fundamentally different purpose, namely, to obtain an output of precisely controlled and variable instantaneous frequency.

The general procedure herein contemplated is to rotate one of the two revoluble generator members at a speed high enough to afford substantially the desired output frequency even when the other member is stationary. Thus, at the very outset, the fundamental operating condition set-up is the antithesis of that for which double rotation generators were originally designed, namely, to halve the necessary speed of each of the two revoluble parts. The remaining member of the generator is, in accordance with the present invention, revolved at a very low speed. The speed of rotation of the first or high speed member is fixed, and that of the low speed member is controllably varied in order to control, correspondingly, the output frequency of the generator. Desirably, the speed of the high speed member is fixed at some mean value within a limited range of frequencies to be covered, and the other or low speed member is arranged for reversible drive so that the output frequency can, by selection of appropriate direction as well as speed for such low speed member, be varied either above or below such mean value.

The error in setting the output frequency when following the foregoing procedure will be extremely small because any error in adjusting the speed of the slow speed generator member will be fractionalized in the output frequency by the ratio of speeds of the two members. Therefore, it is desirable to have as wide a spread as possible between the speeds of the two members in order that any unavoidable error in adjusting the speed of the low speed member will be fractionalized to a correspondingly high degree in the final or output frequency of the generator. More specifically, let it be assumed that the speed of the high speed member is fixed, and that controlled variation of output frequency is accomplished either by turning the slow speed member in the same direction as the high speed member in order to lower the output frequency from the mean value determined by the speed of the high speed member, or by turning the low speed member in the opposite direction in order to raise the output frequency from such mean value. Under such conditions let it be assumed, for example, that the mean value of output frequency is sixty cycles and the generator designed so that such frequency is produced when the high speed member turns at 1,800 R. P. M. and the low speed member is at rest. In such case, if a frequency decrease of 1/100 of a percent is desired, the low speed member is revolved in the same direction as the high speed member and at a speed of 0.18 R. P. M. When following the novel procedure herein disclosed, this latter speed may be determined with sufficient accuracy by an ordinary tachometer applied to an auxiliary drive motor suitably geared to the low speed member, since such a tachometer can easily be read to within five percent, and the resulting error in output frequency will, when proceeding as outlined above, be only five percent of 1/100 of a percent, or five parts in one million added to the desired change in frequency.

In the exemplary construction, the double rotation generator 10 shown comprises a shaft 11 journaled in bearings carried by pedestals 12 and having fixed to it a rotor or generator secondary member 13. Journaled on the shaft 11 itself for rotation coaxially with, but independently of, the secondary member 13 is a primary or field member 14. The primary and secondary members 13, 14 are provided with suitable windings (not shown) of the usual form. In this instance slip rings 15 are provided on the secondary 13 for a three-phase alternating current output, while a pair of slip rings 16 is provided at the opposite end of the primary 14 for supplying exciting current to it.

The generator secondary member 13 is revolved at a constant high speed by a drive motor 17 direct-connected to it through a friction coupling 18 and a flywheel 19, the friction coupling 18 serving to prevent transmission of rapid oscillations from the motor 17 to the generator and the flywheel 19 serving to maintain a constant speed of rotation of the driven generator element at the average of the motor fluctuations. The low speed primary member 14 is, on the other hand, revolved by an auxiliary motor 20 connected through pick-off gears 21 and a worm 22 meshing with a worm wheel 23 rigid with the right-hand end of such member 14. The speed of the auxiliary drive motor 20 can, if desired, be arranged for variation by an ordinary speed control (not shown) and its speed read on a conventional tachometer indicated at 23. The speed of the generator member 14 can then be readily computed by dividing the tachometer reading by the know ratio of the gearing which connects the auxiliary drive motor to the member 14. Substitution of pick-off gears affords a wide latitude in selection of speed ranges.

Since the practical success of the system is dependent upon the accuracy with which the high speed member, in this instance the generator secondary 13, is driven at its selected fixed value of high speed rotation, it is necessary that special provision be made for insuring constancy of speed for the same. For that purpose the special control system illustrated in Fig. 2 is preferably used for maintaining the speed of the drive motor 17 exactly constant. As illustrated, the motor 17 is provided with a conventional motor starter 35, and comprises a rotor 24 and shunt field windings 25, 26 connected in additive relation. The winding 25 has a constant energization, suitably adjustable by a rheostat 25a, while the excitation of the other field winding 26 is automatically controlled to retain the motor speed constant. In brief, the arrangement for the latter purpose comprises a pilot generator 27 having a rotor 28 driven directly by the drive motor 17, and a source of standard frequency indicated at 30. The pilot generator also has a field 29, the excitation of which is varied by a rheostat 29a to adjust to output voltage of the generator. The standard frequency source 30 may take any one of several well-known forms, and may, for example, comprise a vacuum tube oscillator or a tuning fork equipped with an electrical pickup. In any event, the standard frequency supply unit 30 affords an alternating current signal of fixed frequency. This is matched against the frequency of the pilot generator 27 in a vacuum tube circuit as hereinafter described and any deviation of the pilot generator frequency from that of the standard 30 results automatically in a change of excitation for the motor field winding 26 so as to restore the speed of the motor 17 to a selected fixed value corresponding to the frequency of the standard 30.

In the particular circuit shown in Fig. 2, the fixed frequency control signal from the standard 30 is applied to the input circuit of a vacuum tube 31 while the plate of this tube is supplied from the pilot generator 27. The resultant output of the tube 31 is amplified by a second tube 32, rectified by a tube 33, and the rectified output of the latter is amplified by a fourth tube 34. The latter tube 34 supplies the control winding 26 of the drive motor 17.

As to the details of the drive motor control circuit in Fig. 2, the heaters of the cathodes of all of the tubes 31 to 34 are supplied from a transformer 36 under the control of a switch 37. The tube 31 has a grid 38, a cathode 39 and a plate 40. In the input circuit of this tube 31 a potentiometer 41 is energized from the standard frequency supply 30 and is connected in series between the cathode 39 and grid 38 with a resistor 42 and biasing battery 43. In the output circuit of the tube 31, on the other hand, the plate 40 is connected to one terminal of the secondary winding 44 of a transformer 45, while the other terminal of this winding is connected to the cathode 39 through a resistor 46. The primary winding 47 of the transformer 45 is energized by the pilot generator 27 through leads 48 and under the control of a switch 49.

With the circuit connections as so far described, when the drive motor 17 is running at exactly the proper speed, the plate 40 of the first tube 31 is supplied with an alternating current potential from the pilot generator 27, via the transformer 45, of the same frequency as the signal from the standard frequency supply 30. The biased grid 38 is supplied with a signal from the standard frequency supply unit 30 of such phase relationship with the plate supply that the tube conducts during a portion of each cycle when the plate is positive, and the grid is more positive than the cut-off point. The alternating current component of the plate current of the tube thus constitutes a signal of constant frequency and magnitude which is, as hereinafter explained, applied to the next tube 32. Assume next, however, that the drive motor 17 is caused to slow down by an extremely small amount, say 1/1000 of a percent. The condition then existing is that a vector representing the grid signal applied to the tube 31 is of constant magnitude, and is advancing in a positive direction with respect to the plate potential at a rate of 1/1000 of one percent. This means that in 25,000 cycles this vector would advance 90 electrical degrees with respect to the plate potential. In the case of 60 cycle frequency this would require 6.94 minutes. By biasing the tube 31 toward cut-off, however, and by using a relatively high standard frequency voltage, the tube may be caused to conduct over only a desired portion of each alternate half cycle. By adjusting the bias voltage applied by the battery 43, the length of the conducting portion of each cycle can be changed, and if it is made short, a small change of phase difference results in a large percentage change in the length of the conducting portion of each cycle with a correspondingly large percentage change in the amount of current passed by the tube. In this way the speed of response is made high even for very small changes.

The output of the tube 31 is directly coupled to the input of the next or amplifier tube 32. Thus, the tube 32, which comprises a grid 50, cathode 51 and plate 52, has its grid 50 connected through lead 53 to one terminal of the resistor 46 in the output circuit of the tube 31. The input circuit of the tube 32 is completed from grid 50 and resistor 46, to the cathode 51, through a resistor 54 shunted by a condenser 55. Plate voltage is applied to the tube 32 from a suitable source of direct current (not shown) connected to terminals 56. One of these terminals is connected to cathode 51 through lead 57, while the other terminal is connected to the plate 52 through lead 58 and primary winding 59 of a coupling transformer 60.

The output of the amplifier tube 32 is applied to the rectifier tube 33 through a coupling transformer 60, the secondary winding 61 of the latter having its terminals connected respectively to the anode 62 and cathode 63 of the rectifier. Inserted in the connection from the coupling transformer to the rectifier cathode 63 is a potentiometer 64. This potentiometer 64 is connected in the input circuit of the final amplifier tube 34. Thus, the sliding contact 64a of the potentiometer is connected to a grid 65 of tube 34, while one end terminal of the potentiometer is connected to cathode 66 of the latter tube.

In the output circuit of the tube 34 its plate 67 and cathode 66 are connected by leads 68 and 69, respectively, a switch 74, and respective leads 68, 69 to the terminals of the motor field winding 26. Plate voltage is applied through jumper 70 from the positive terminal of the direct current supply source and a lead 75 from the line 57 from the negative terminal. The switch 74 serves, in conjunction with rheostats 71, 72, to condition the circuit in cutting the automatic control in for motor 17 in a manner hereinafter described. For the present it is sufficient to note that when switch 74 is in its "on" position, as it is for automatic operation, the motor field 26 is directly in the output circuit of tube 34.

In the event that the drive motor 17 is running at precisely its selected fixed speed, so that the frequency of the pilot generator 27 exactly matches that of the standard frequency supply 30, the output of the tube 31 will be of a predetermined fixed value. Such output, through the medium of the amplifier tube 32, rectifier 33 and last amplifier tube 34, results in the application of a corresponding predetermined value of exciting current in the motor winding 26, exactly commensurate with the desired motor speed. Upon even a small decrease in motor speed, of for example 1/1000 of a percent as assumed above, the resulting advance in phase of the grid signal with respect to that applied to the plate (in tube 31) will, as heretofore explained, make a large percentage change in the conducting portion of each cycle, with corresponding change in the amount of current passed by the tube. The increase, thus effected, in the input signal to the second tube 32 results in a greater output from this amplifier tube and, hence, in an increased direct current potential across potentiometer 64 on the output side of the rectifier 33. Therefore the negative bias applied to the grid 65 of the succeeding amplifier tube 34 is increased so that the output or plate current of the latter tube is reduced. Such decrease in the plate current of tube 34, which is the exciting current for field winding 26, results in speeding up the motor 17 again. It will be clear that an increase in motor speed above its desired value will result in an opposite series of changes, with the end result of increasing the excitation of field winding 26 and thus bringing the speed of motor 17 back down to normal. With such an arrangement it has been found possible to hold the speed of the motor 17 so constant that the maximum phase deviation between the pilot generator 27 driven by it, and a standard frequency established by a temperature controlled tuning fork, was not in excess of two or three electrical degrees.

In starting up the system of Fig. 2 the automatic control for the motor 17 is initially disabled by putting switch 74 in its "off" position. In such case the motor field 26 is connected across the direct current supply terminals in series with the rheostat 71 while the rheostat 72 is connected in the output circuit of the tube 34. The resistance setting of the rheostat 72 is predetermined to match substantially the resistance of the field 26. A voltmeter 73, which is a center zero instrument, is connected across the center or blade terminals of the switch 74 as shown. The motor 17 is brought approximately to speed by hand control (i. e., rheostat 25a) and as the speed of the motor 17 approaches the proper value the pointer of the voltmeter 73 swings more slowly on both sides of center. If the magnitude of its swings on opposite sides of center is not the same, the rheostat 71 is adjusted slightly until the swing is symmetrical. When the output frequency of the generator 27 closely approaches the frequency output of the standard frequency supply 30, the swings of the voltmeter pointer become very slow, and as the pointer crosses zero the switch 74 is thrown from its "off" to its "on" position, thereby putting the automatic control system in control of the motor 17.

The operation of the system will, in general, be clear from the foregoing. By way of brief recapitulation, it may be noted that the secondary 13 of the double rotation generator 10 is driven at constant speed by the motor 17. The speed of the latter is automatically regulated within extremely close limits by the system of Fig. 2, as described. The speed selected for the generator secondary 13 is such as to give an output frequency for the generator 10 falling within the range desired even when the primary 14 is at rest. The output frequency of the generator 10 is then increased or decreased by, respectively, revolving the primary 14 by its auxiliary drive motor 20 in the opposite direction or in the same direction as the secondary 13. The fixed speed of the primary 13 being known, the output frequency of the generator 10 can readily be calculated by reading the speed of the auxiliary drive motor 20 on the tachometer 23 and computing the speed of the primary 14 from such reading and the ratio of the gearing 21, 22, 23. The high degree of accuracy of such calculation has been heretofore explained. By varying the direction and speed of the auxiliary drive motor the output frequency can be increased or decreased at will. It will thus be seen that a comparatively simple, and highly effective, method and apparatus have been provided for achieving quite an extraordinary degree of accuracy in control of instantaneous frequency of an alternating current.

I claim as my invention:

1. The method of operating a double rotation alternating current generator provided with independently rotatable primary and secondary members to produce an output frequency of controlled instantaneous frequency within a desired limited range of variation, which comprises, rotating one of said members at a fixed speed corresponding to a selected mean value of output frequency with the other member stationary, operating a pilot generator at the same speed as that of said one of the members, maintaining precise control of the speed of said one of the members by maintaining synchronism of the pilot generator with a standard frequency supply source, and varying the output frequency from said mean value by revolving said other member in one direction or the other to correspondingly increase or decrease the output frequency, but within a range of variation of speed for said other member, even the upper limit of which is small as compared to the speed of said one member, whereby any error in fixing the speed of said other member will result in an error in accuracy of the output frequency which is only the small fraction of the first mentioned error determined by the ratio of speeds of the two members.

2. An apparatus for providing an alternating current of precisely controlled and variable instantaneous frequency comprising, in combination, a double rotation generator having relatively rotatable primary and secondary members, a standard frequency supply source, means for rotating one of said members at a constant speed sufficient to produce a mean value of output frequency for the generator within a selected range of variation of the same even when the other member is stationary, means for maintaining the speed of said one of the members in substantially instantaneous synchronism with the standard frequency supply source, and reversible means for rotating the other member in a direction and at a determinate slow speed which is small as compared to the speed of rotation of the first member.

3. The method of operating a double rotation alternating current generator provided with independently rotatable primary and secondary members to produce an output of precisely controlled instantaneous frequency, which comprises, rotating one of said members at a predetermined speed which is substantially constant and great enough to produce an output frequency approximating a selected range of variation of the latter even when the other member is stationary, precisely controlling the speed of said one of the members to maintain substantially instantaneous synchronism thereof with a standard frequency source, and rotating the other member at a slow speed which is but a small fraction of that of said one member and of a value related to the latter such as to produce an output frequency of precisely the desired value.

4. An apparatus for providing an alternating current of precisely controlled and variable instantaneous frequency comprising, in combination, a source of standard frequency, a double rotation generator having relatively rotatable primary and secondary members, means for rotating one of said members at a constant speed which is high enough to produce an output frequency of substantially the desired magnitude even when the other member is stationary, means including a pilot generator for controlling the speed of said one of said members to maintain constant synchronism of said one of said members with said source of standard frequency, and means for rotating said other member at a speed, variable at will, which is but a small fraction of that of the first member.

5. Apparatus for providing an alternating current of precisely controlled and variable instantaneous frequency comprising, in combination, a double rotation generator having relatively rotatable primary and secondary members, a prime mover for rotating one of the members at a substantially constant speed to produce a predetermined output frequency when the other member is stationary, a standard source of constant frequency, means driven by said prime mover producing a frequency adapted to be synchronized with that of the standard source, control means responsive to instantaneous differences of the frequency of the last mentioned means from that of the standard source for providing substantially instantaneous corrections of the speed of said prime mover, and a separate prime mover for rotating the other of said members at definite speeds to produce variations of the output frequency of the double rotation generator.

6. Apparatus for providing an alternating current of precisely controlled and variable instantaneous frequency comprising, in combination, a double rotation generator having relatively rotatable primary and secondary members, a prime mover for rotating one of the members at a substantially constant speed to produce a predetermined output frequency when the other member is stationary, a standard source of constant frequency, a pilot generator driven by said prime mover producing a frequency adapted to be synchronized with that of the standard source, control means including a vacuum tube responsive to instantaneous differences of the frequency of the pilot generator from that of the standard source for providing substantially instantaneous corrections of the speed of said prime mover, and a separate prime mover for rotating the other of said members at definite speeds to produce variations of the output frequency of the double rotation generator.

7. Apparatus for providing an alternating current of precisely controlled and variable instantaneous frequency comprising, in combination, a double rotation generator having relatively rotatable primary and secondary members, a prime mover for rotating one of the members at a substantially constant speed to produce a predetermined output frequency when the other member is stationary, a standard source of constant frequency, means driven by said prime mover producing a frequency adapted to be synchronized with that of the standard source, control means including a vacuum tube having different electrodes connected to the last mentioned means and the standard source and responsive to instantaneous differences of the frequency of the last mentioned means from that of the standard source for providing substantially instantaneous corrections of the speed of said prime mover, and a separate prime mover for rotating the other of said members at definite speeds to produce variations of the output frequency of the double rotation generator.

8. Apparatus for providing an alternating current of precisely controlled and variable instantaneous frequency comprising, in combination, a double rotation generator having relatively rotatable primary and secondary members, a prime mover for rotating one of the members at a substantially constant speed to produce a predetermined output frequency when the other member is stationary, a standard source of constant frequency, means driven by said prime mover producing a frequency adapted to be synchronized with that of the standard source, means for manually effecting preliminary synchronization of the output frequency of the last mentioned means to that of the standard source, control means responsive to instantaneous differences of the frequency of the last mentioned means from that of the standard source for providing substantially instantaneous corrections of the speed of said prime mover, and a separate prime mover for rotating the other of said members at definite speeds to produce variations of the output frequency of the double rotation generator.

GEORGE FORREST DRAKE.